United States Patent [19]

Smith

[11] 4,251,237
[45] Feb. 17, 1981

[54] AIR FILTER AND METHOD OF FILTERING

[76] Inventor: Randall E. Smith, Rte. 10, Box 312, Spartanburg, S.C. 29303

[21] Appl. No.: 121,048

[22] Filed: Feb. 13, 1980

[51] Int. Cl.³ .............................................. B01D 46/04
[52] U.S. Cl. ............................................ 55/96; 55/97; 55/294; 55/332; 55/431
[58] Field of Search ...................... 55/96, 97, 290, 294, 55/330, 332, 351, 431

[56] References Cited

U.S. PATENT DOCUMENTS

| | | | |
|---|---|---|---|
| 964,377 | 7/1910 | Blass | 55/400 |
| 1,497,176 | 6/1924 | James | 209/452 |
| 1,525,308 | 2/1925 | Lough | 55/290 |
| 1,995,648 | 3/1935 | Rathbun | 55/294 |
| 2,788,860 | 4/1957 | Turner | 55/400 |
| 3,339,348 | 9/1967 | Bratton et al. | 55/294 |
| 3,345,805 | 10/1967 | Sherrill | 55/271 |
| 3,377,780 | 4/1968 | Noland | 55/294 |
| 3,483,675 | 12/1969 | King, Jr. | 55/294 |
| 3,757,496 | 9/1973 | Berg | 55/293 |
| 3,864,107 | 2/1975 | Baigas, Jr. | 55/290 |
| 3,887,344 | 6/1975 | Smith | 55/294 |
| 4,045,194 | 8/1977 | Ferri | 55/290 |
| 4,082,524 | 4/1978 | Noland | 55/294 |
| 4,154,588 | 5/1979 | Herndon, Jr. | 55/283 |

Primary Examiner—David L. Lacey
Attorney, Agent, or Firm—Luke J. Wilburn, Jr.; Wellington M. Manning, Jr.

[57] ABSTRACT

An improved method and apparatus for removing solid contaminants from the air comprising a generally stationary horizontally disposed cylindrical housing having a pair of spaced opposed vertical end walls and a peripherally disposed filter medium wall extending therebetween to define a filter compartment, a reduced air inlet opening in one end wall for introducing air to be filtered into the compartment and initially directing the same in a path of travel to the other end wall for deflection and recirculation through the compartment in a generally circular path before passage through the cylindrical filter medium wall for filtration thereby, and a plurality of contaminant discharge openings spaced about the lower peripheral portion of the other end wall for directly removing contaminants in the air from the compartment before their entrapment on the filter medium of the unit.

15 Claims, 4 Drawing Figures

AIR FILTER AND METHOD OF FILTERING

This invention relates to an improved air filter unit, and, more particularly, to an improved air filter unit of the self-cleaning type generally employed to remove solid contaminants from large volumes of air in industrial plants. The invention is also directed to an improved method of removing contaminants from large volumes of air filtered through a mechanical filtration system.

BACKGROUND OF THE INVENTION

Air filters are employed in manufacturing operations, such as in textile manufacturing plants, to remove contaminants, such as dust, lint and other airborne fibrous materials from the environment, not only for the health, comfort and safety of operator personnel, but also to protect processing equipment and other air conditioning equipment employed in connection with the manufacturing operation. Because of the large volume of air which must be handled and effectively filtered, industrial air filter units typically comprise relatively large cylindrical drums having a large peripheral filter surface area. Air in the immediate and/or surrounding areas of processing equipment is passed at a desired flow rate into the interior of the drum and outwardly through the filter medium as solid contaminants are collected on the inner surface of the filter medium. Generally such air filter units employ filter cleaning means, such as movable suction nozzles, which transverse the filter medium surface to draw the collected contaminants from the filter medium and convey them to a remote point for disposal. A number of industrial type air filter devices are disclosed in the following U.S. Pat. Nos.:

964,377
1,497,176
2,788,860
3,339,348
3,345,805
3,377,780
3,757,496
3,864,107
4,045,194
4,082,524
4,154,588

My own prior U.S. Pat. No. 3,887,344 discloses, in particular, a stationary self-cleaning filter drum of cylindrical shape with peripherally disposed filter medium, and a closed end. Air to be filtered is introduced into the interior of the drum through the open end of the drum and passes generally at right angles outwardly through the filter medium as the contaminants therein are collected on the medium. The filtered air leaving the periphery of the drum passes back into the general processing area or it may be directed by suitable ducting to a desired point of use. Collected contaminants are removed from the filter medium by one or more suction nozzles mounted for rotation over the inside surface of the filter medium and connected to a central manifold pipe in the drum. One end of the manifold pipe is connected by a conduit to a suction source and contaminant collection device where the contaminants removed from the system may be suitably disposed of.

Because of the large amount of solid contaminants which are present in the air around certain industrial processing operations, such as in and around textile shearing and napping equipment, a filter drum sized for a particular air flow rate may often become loaded with contaminants faster than the contaminants can be removed from the filter medium surface by the suction nozzles, resulting in clogging of the unit and loss of efficiency of the unit. Obviously, it is desirable to maintain optimum contaminant removal from the air, while maintaining the filter drum and area of the filter medium sized for the desired air flow rate through the system.

OBJECTS OF THE INVENTION

It is therefore an object of the present invention to provide an improved self-cleaning air filter of the general type hereinbefore described.

It is another object to provide a self-cleaning air filter having increased capacity for removal of solid contaminants from the air.

It is another object to provide an improvement in a self-cleaning industrial air filter construction of the type described in my aforesaid U.S. Pat. No. 3,887,344, which provides increased capacity for filtration at nominal cost and while maintaining a desired air flow rate through the system.

It is a more specific object to provide an improved air filter unit of the self-cleaning type wherein an appreciable portion of the contaminants in the air directed through the filter unit are withdrawn directly from the filtration compartment without the necessity of entrapment on and removal from the filter medium of the unit.

It is a further object to provide an improved method of removing contaminants from large volumes of air circulated through a mechanical filtration system.

SUMMARY OF THE INVENTION

Briefly, the present invention comprises a self-cleaning air filter unit of the general type described in my aforesaid patent but wherein incoming air to be filtered is directed into the filter compartment of the unit at an accelerated rate through a reduced air inlet opening in one end of the filter unit to pass directly across the compartment to an opposite end wall of the unit before its passage through the filter medium of the unit. Foreign materials and contaminants, particularly heavy materials, entrained in the air stream thus pass directly to the rear wall where they are removed from the filter compartment through one or more small discharge openings in the rear wall to provide increased rate of contaminant removal without having to vary the air flow rate or size and surface area of the filter medium of the unit.

Preferably air introduced into the filter compartment is directed across the lower portion of the compartment to strike the lower rear wall thereof, while contaminants therein are immediately removed through the discharge openings in the lower portion of the rear wall. By impingement of the entering air stream against the rear wall, the air is deflected in a generally circular path through the compartment before passing outwardly of the peripherally disposed filter medium, such that additional contaminants in the air may be redirected to the discharge openings for removal without entrapment on the filter medium.

Suction means, such as a material handling fan, is connected by suitable conduits to the discharge openings in the rear wall of the filter compartment and to the filter cleaning suction manifold pipe to convey the contaminants removed from the filter compartment to a remote point for collection.

BRIEF DESCRIPTION OF THE FIGURES

The present invention will be better understood, and the foregoing as well as other objects of the invention will become more apparent, from the following detailed description of a preferred embodiment of the invention, when taken together with the accompanying drawings, in which.

DETAILED DESCRIPTION OF A PREFERRED EMBODIMENT OF THE INVENTION

Figure 1:
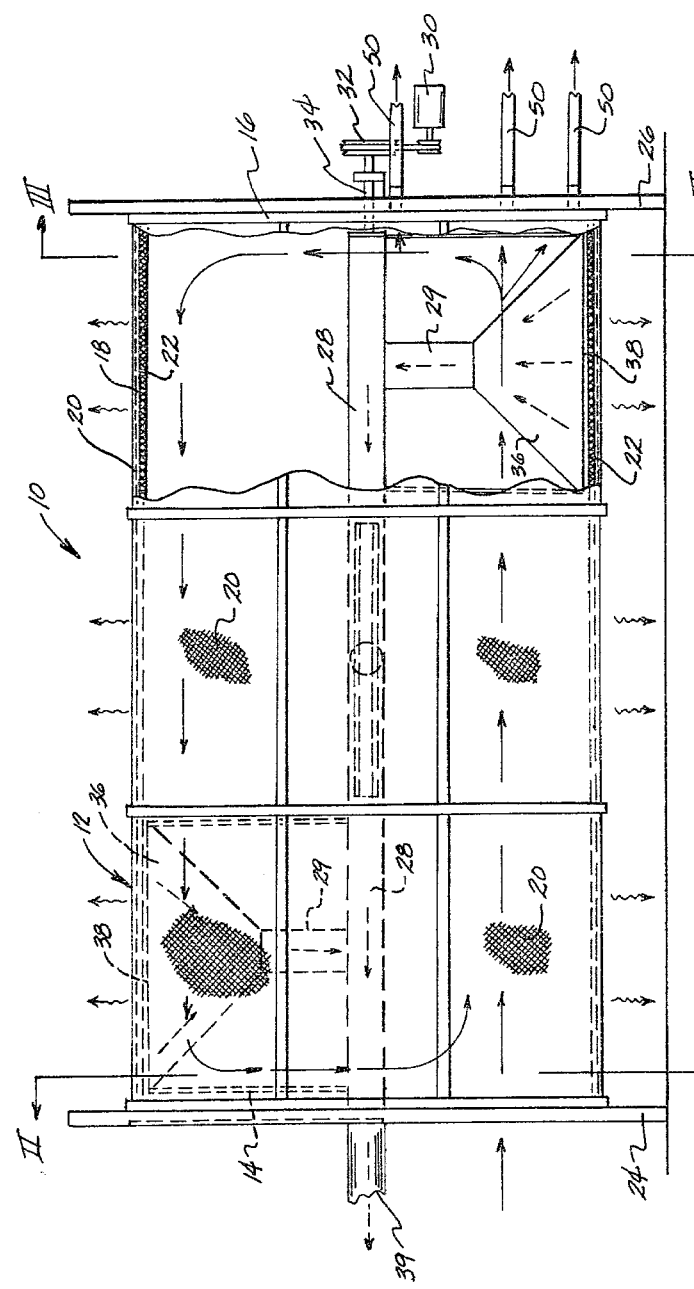
FIG. 1 is a schematic side elevation view of the improved filter unit of the present invention, with portions broken away to better show interior components thereof.

Referring more particularly to the drawings, a preferred embodiment of the self-cleaning air filter unit of the present invention is generally indicated at 10 in FIG. 1 and includes a generally cylindrical filter housing 12 having opposed vertical end walls 14, 16 and a cylindrical filter wall portion 18 containing a filter medium. As shown, the cylindrical wall portion 18 comprises an outer peripherally and longitudinally supported wire screen 20, and a suitable filter medium, such as a woven, knitted, or non-woven textile fabric 22, is supportably attached to the inner surface of the screen in suitable manner, as by edge gripping strips, or clamps (not shown). The cylindrical housing 12 is disposed with its central axis generally horizontal, and is supported by frame members 24, 26 attached to each end of the cylindrical housing.

The vertical end walls 14, 16 and cylindrically disposed filter medium 22 extending therebetween define a filter compartment for receiving contaminant-laden air to be filtered. Positioned on the central axis of the cylindrical housing for rotation about a generally horizontal axis is an elongate suction manifold pipe 28. The manifold pipe 28 is mounted for rotation in suitable bearing members on end walls 14, 16 and is rotated by a motor 30 which is connected by a chain and sprocket 32 to a drive shaft 34 attached to a closed end of the manifold pipe at end wall 16. As seen in FIG. 1, manifold pipe 28 supports and is connected by conduits 29 to a plurality of suction nozzles 36 (two of which are illustrated in FIG. 1) which extend radially outwardly from the manifold and have elongate narrow suction inlets 38 located in close proximity to the inside surface of the filter medium 22. The nozzles 36 are thus rotated by manifold pipe 28 to remove collected contaminants from the filter medium during the filtering operation.

The open end 39 of manifold pipe 28 is suitably connected, as by gasket and sleeve arrangement (not shown), to a conduit 40 (FIG. 4) which is connected to a suction source, such as a material handling fan 42. Fan 42 creates a suction, or reduced pressure, in the manifold pipe and nozzles to remove contaminants collected on the filter medium from the filter compartment. Details of the connection of the manifold pipe to the external conduit and suction source are described in my aforesaid U.S. Pat. No. 3,887,344, and such details, per se, do not form a part of the present invention.

Figure 2:
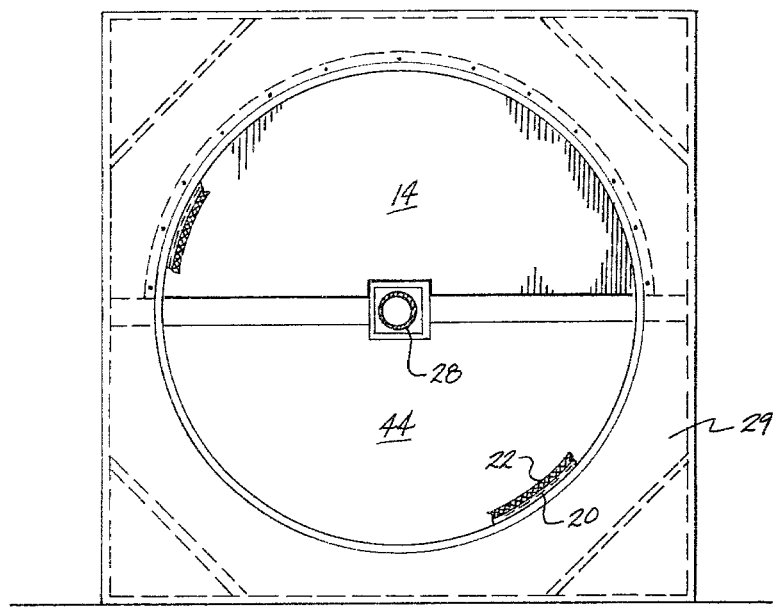
FIG. 2 is a sectional elevation view taken generally along line II—II of FIG. 1, and looking in the direction of the arrows.

As best seen in FIG. 2, the front vertical wall 14 of housing 12 has a reduced inlet opening 44 in the lower half of the wall for introduction of air into the filter compartment from a desired area, such as around processing equipment in a textile mill. Air to be filtered may be directed to the filter unit inlet opening 44 by suitable ducting 45 (FIG. 4) containing a material handling fan 46 to give a desired flow rate of air through the filter unit. The reduced inlet opening 44 in wall 14 provides positive accelerated flow of the incoming air initially in a generally direct path across the lower portion of the filter compartment to the rear wall 16 where it strikes the wall and is deflected generally upwardly and in a counterclockwise circular path around the compartment before passing outwardly through the filter medium 22. Note the general air flow pattern indicated by arrows in FIGS. 1 and 4.

Figure 3:
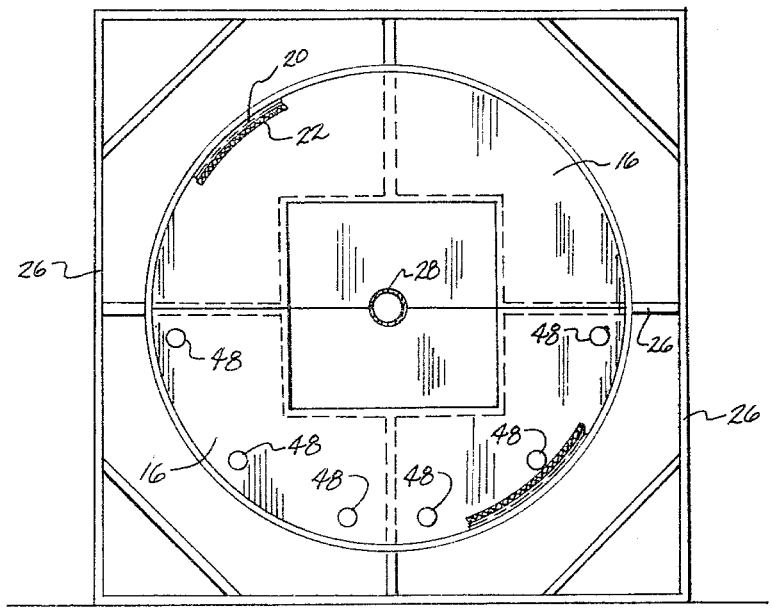
FIG. 3 is a sectional elevation view taken generally along line III—III of FIG. 1, and looking in the direction of the arrows.

As best seen in FIG. 3, located in spaced relation along the lower 180° peripheral edge of the rear housing wall 16 adjacent the surface of the cylindrical filter medium 22 are a plurality of small discharge openings 48 for removal of contaminants directly from the filter compartment before they become entrapped on the filter medium 22 of the unit.

Figure 4:
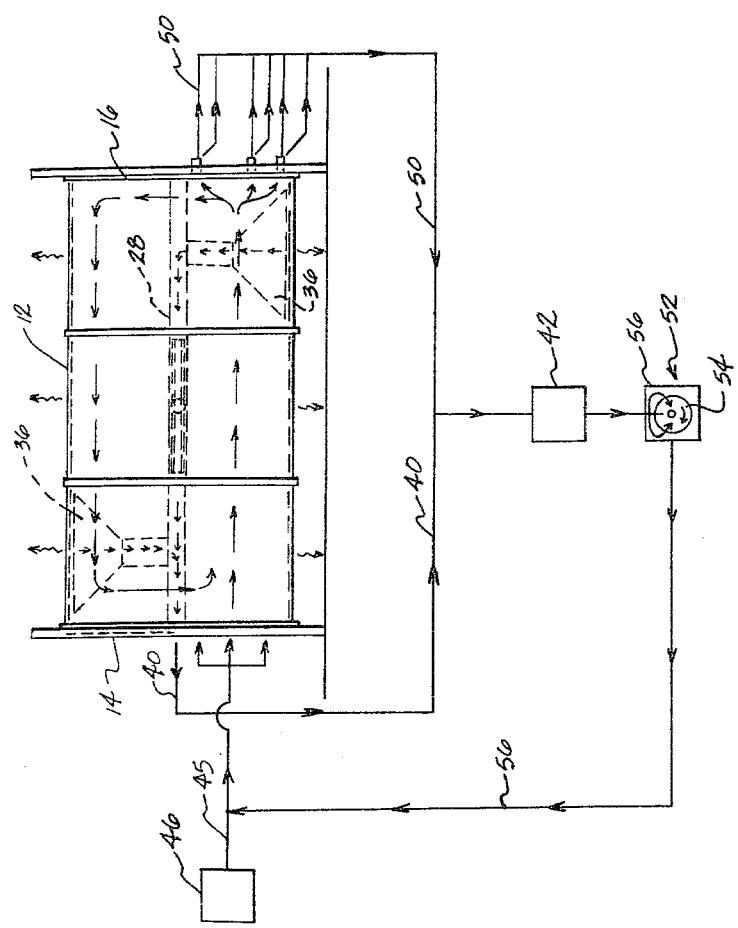
FIG. 4 is a diagrammatic representation of a typical air handling filtration system for removal of contaminants from the air, in which the improved filter unit of the present invention may be employed.

FIG. 4 illustrates, diagrammatically, a preferred air handling system in which the improved filter unit of the present invention may be employed. As seen, each of the small contaminant discharge openings 48 in the lower rear wall 18 of the filter unit of FIGS. 1-3 is connected by conduits 50 to material handling fan 42 which is in turn connected to a contaminant condenser unit 52. In like manner, the outlet end 39 of the suction manifold 28 of the filter unit is connected by conduit 40 to the fan 42 and condenser unit 52, such that the fan creates a suction both in the filter cleaning nozzles 36 and at the discharge outlets 48 to withdraw and convey contaminants from the compartment to the condenser unit 52.

Typically, condenser unit 52 may be of conventional type having a rotatable screen filter 54 surrounded by a housing 55 into which contaminants removed from the main filter unit 12 are directed by fan 42. Contaminants collect in a layer on the outside surface of the filter screen as air passes through the screen to the interior thereof and is redirected to the inlet opening 44 of the main filter unit by a suitable conduit 56. The condenser unit filter screen 54 is periodically rotated in response to air pressure build up in the housing to discharge portions of the layer of contaminants collected thereon from the housing. An air pressure sensing device located in the compartment and electrically connected to activate a filter screen drive motor (not shown) may be employed to accomplish this purpose.

As seen in FIG. 4, air to be filtered may be directed from a remote area into the reduced inlet opening 44 of the main filter unit by means of inlet ducting 45 containing material handling fan 46. The entering air passes directly across the filter compartment to impinge upon the lower portion of rear end wall 16 and be deflected upwardly thereby and in a generally circular path back towards the upper portion of front end wall 14. As the entering air stream reaches the rear end wall and is deflected thereby, a large portion of the airborne contaminants carried in the air sream are immediately drawn by suction through the discharge openings in the lower portion of the wall from the compartment. Redirected air from the rear wall is further redirected by the upper portion of the front wall 14 back into the entering air stream and returns again to the lower rear wall portion where further contaminants therein may be withdrawn from the compartment through discharge openings 48.

Filtered air passing through the filter medium of the main filter unit through the peripheral filter wall may be recirculated into the general area surrounding the unit, as indicated by the air flow arrows in FIG. 1, or to other specific areas by suitable ducting, if desired.

As can be seen from the foregoing description of a preferred embodiment of the filter unit of the present invention, the unit may be employed to more rapidly and efficiently remove contaminants from the air by initial direction of the air through the unit to the discharge openings provided in the rear wall of the filter compartment, such that the filter unit is capable of handling and filtering more contaminants contained in the air than the similar sized industrial air filters of the prior art. Such improved efficiency may be obtained without varying the size of the filter unit and/or air flow rate through the unit.

The size of the filter unit and the surface area of the filter medium to be employed therein may be varied, depending upon the desired air flow rate, i.e., cubic feet per minute of air, to be handled by the system. Similarly, the size and number of the contaminant discharge outlets in the rear wall of the unit may be somewhat varied, depending upon the air flow rate and amount of contaminants in the air to be filtered by the unit. Typically, excellent results in increased capacity for contaminant removal have been obtained in filter units having a diameter of between 7 and 10 feet, by the use of six 3 inch diameter discharge outlets disposed about the lower half of the filtration compartment of the unit. In such a filter unit sized to handle a 30,000 cu. ft. per minute air flow rate, excellent results have been obtained in increased contaminant removal utilizing six 3 inch diameter contaminant discharge outlets, each handling an air flow of 400 cu. ft. per minute, and with suction nozzle orifices sized to handle a total suction air flow rate of 1,600 cu. ft. per minute, leaving 26,000 cu. ft. per minute air flow rate through the main filter medium of the unit.

That which is claimed is:

1. An improved self-cleaning filter unit for removing contaminants from air directed therethrough comprising a housing having a pair of spaced walls and a peripherally disposed filter medium extending therebetween to define a filter compartment, an air inlet opening in a portion of one wall of sufficient size for introducing air to be filtered into the compartment and initially directing the same in a path of travel to the other wall before its passage outwardly through said filter medium, movable nozzle means in the filter compartment for traversing the filter medium to remove contaminants collected thereon, conduit means connected to the nozzle means for conveying the removed contaminants from the filter compartment, and one or more discharge openings in a portion of said other wall which lies in the path of the travel of the air directed from said inlet opening to permit direct removal of a portion of the contaminants in the air stream from the compartment before its passage through said filter medium.

2. The filter unit as defined in claim 1 wherein said spaced walls are generally vertical and disposed in opposed relation, said inlet opening is located in a lower portion of said one wall, and said one or more discharge openings are located in a lower portion of said other wall.

3. The filter unit as defined in claim 2 wherein said housing is of generally cylindrical shape, said opposed walls form end walls of the filter compartment and are disposed generally perpendicular to the longitudinal axis thereof, and wherein said one or more discharge openings comprise a plurality of discharge openings spaced along the lower peripheral portion of said other end wall.

4. The filter unit as defined in claim 2 including conduit means communicating with said one or more discharge openings for conveying contaminants discharged therethrough to a remote location from said filter housing.

5. The filter unit as defined in claim 4 further including suction means connected to said discharge opening conduit means for withdrawing contaminants from said compartment and transporting the same through said conduit means to said remote location.

6. The filter unit as defined in claim 5 wherein said suction means is also connected to said nozzle conduit means for conveying contaminants removed from said filter medium to said remote location.

7. The filter unit as defined in claim 6 including contaminant condenser means at said remote location for accumulating contaminants directed thereto from said air filter.

8. The filter unit as defined in claim 2 wherein said inlet opening is located in a lower portion of said one wall for introducing air to be filtered into said compartment, and said one or more discharge openings in said other wall are located in the lower portion of said other end wall in the path of travel of said air from said inlet opening of the compartment.

9. An improved self cleaning filter unit for removing solid contaminants from air directed therethrough comprising a stationary, generally cylindrical housing having a pair of spaced vertical end walls and a cylindrical filter medium wall extending therebetween to define a filter compartment, an air inlet opening in the lower portion of one of said end walls and of sufficient size for introducing air to be filtered into the compartment and initially directing the same in a generally horizontal path of travel across the lower portion of the compartment to the other end wall for deflection thereby, a plurality of contaminant discharge openings located in spaced relation about the lower peripheral portion of said other end wall and in the path of travel of air thereto from said inlet opening for direct removal of contaminants entrained in the air from said compartment before entrapment thereof on said filter medium wall, suction nozzle means mounted in said compartment for movement over the inner surface of said filter medium wall to remove contaminants collected thereon, and conduit means connected to said nozzle means for conveying the removed contaminants from the filter compartment.

10. An improved method of filtering airborne contaminants from air directed through a filtration unit having a pair of spaced walls and a peripherally disposed filter medium extending therebetween to define a filtration compartment, comprising the steps of directing the air into the compartment through an air inlet opening in one wall thereof and in an initial stream across the compartment to the other end wall for deflection thereby in a generally circular path about the compartment before passage through said filter medium, removing an initial portion of the contaminants carried in the air stream from the compartment through one or more discharge openings in said other end wall before its passage through the peripherally disposed filter medium, and removing contaminants collected on the filter medium during passage of air therethrough from the filter compartment to clean the filter medium during filtration.

11. A method as defined in claim 10 wherein the air entering the compartment is directed initially in a generally horizontal path across the lower portion of the compartment between said walls to strike and be deflected generally upwardly in the compartment by said other wall, and wherein said initial portion of said contaminants are removed from the compartment through said one or more discharge openings located in the lower portion of said other end wall.

12. A method as defined in claim 11 wherein the filter compartment is generally cylindrical in shape, is disposed with its central axis generally horizontal and said walls are generally vertical and located in opposed relation, and wherein air is introduced and initially directed across the compartment to said other wall through said inlet opening located in the lower portion of said one wall, and wherein said portion of the contaminants are removed from the compartment through a plurality of discharge openings spaced about the lower peripheral portion of said other end wall.

13. A method as defined in claim 12 including the step of conveying contaminants removed from said filter compartment through said discharge openings to a collection point outside said filter compartment.

14. A method as defined in claim 13 including the step of conveying contaminants removed from said filter medium to said collection point.

15. A method as defined in claim 12 wherein air introduced and initially directed across the compartment is further directed in a circular path in the compartment such that a portion of the air stream deflected by said other end wall is redirected into the air stream entering the compartment toward said discharge openings for removal of additional contaminants in the air through said openings.

* * * * *